United States Patent [19]

Pippin

[11] 3,717,667
[45] Feb. 20, 1973

[54] 2-N-ALKYL-AMINO-2-DEOXY-ALDITONITRILES AS BIOCIDALS

[75] Inventor: Wallace H. Pippin, Holland, Pa.

[73] Assignee: Rohm and Haas Company, Philadelphia, Pa.

[22] Filed: July 15, 1970

[21] Appl. No.: 55,237

[52] U.S. Cl. ...................260/464, 71/67, 71/105, 260/465.4, 260/465.5, 424/304
[51] Int. Cl. .................... C07c 121/46, C07c 121/34, C 07 c, 121/38
[58] Field of Search.................................260/465 E, 465.5, 465 D, 465.4, 260/464

[56] References Cited

UNITED STATES PATENTS

| | | | |
|---|---|---|---|
| 2,468,352 | 4/1949 | Warner et al. | 260/465.4 |
| 3,090,803 | 5/1963 | Stansbury, Jr. et al. | 260/465.4 |
| 3,413,344 | 11/1968 | Quigley et al. | 260/465.4 X |
| 2,922,783 | 1/1960 | Kuhn et al. | 260/211 R |

OTHER PUBLICATIONS

Kuhn et al., Annolen der Chemie, 602, pages 217-—227 (1957)

*Primary Examiner*—Joseph P. Brust
*Attorney*—George W. F. Simmons, Carl A. Castellman and Arthur R. Eglington

[57] ABSTRACT

This invention relates to novel 2-alkylamino-2-desoxy-alditonitriles, salts thereof, their preparation, biocidal compositions containing them, and their utilization in the control of living organisms.

5 Claims, No Drawings

2-N-ALKYL-AMINO-2-DEOXY-ALDITONITRILES AS BIOCIDALS

These novel 2-N-alkylamino-2-deoxyalditonitriles (hereinafter sometimes generically referred to as alditonitriles) are represented by the general structural formula:

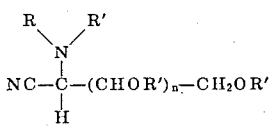

wherein R is alkyl straight or branched having from six to 18 carbon atoms; cycloalkyl having six to 18 carbons; and Alk—NR'—$(CH_2)_3$—, wherein Alk is six to 20 carbons; R' is an acyl group having two to six carbons, such as acetyl or is hydrogen; and $n$ is a whole positive integer from 2 to 4;

Preferred compounds are those where $n$ is 4, the $(CHOH_4)$ takes the glucosyl configuration; the R' groups are hydrogen, and R is one of:

1. a straight chain alkyl from eight to 16 carbons;
2. cycloalkyl from $C_{10}$ to $C_{14}$, and;
3. 3-alkaminopropyl, where the alk has 10 to 20 carbon atoms Representative R substituents where it is straight or branched chain, includes n-hexyl, sec-hexyl, tert-hexyl, n-heptyl, sec-heptyl, tert-heptyl, n-octyl, sec-octyl, tert-octyl, n-nonyl, sec-nonyl, tert-nonyl, n-decyl, sec-decyl, tert-decyl, n-undecyl, sec-undecyl, tert-undecyl, n-dodecyl, sec-dodecyl, tert-dodecyl, n-tridecyl, sec-tridecyl, tert-tridecyl, n-tetradecyl, sec-tetradecyl, tert-tetradecyl, n-pentadecyl, sec-pentadecyl, tert-pentadecyl, n-hexadecyl, sec-hexadecyl, and tert-hexadecyl, cyclopentyl.

Representative cycloalkyls include, cyclohexyl cycloheptyl, cyclooctyl, cyclononyl, cyclodecyl, cycloundecyl, cyclododecyl, cyclotridecyl, cyclotetradecyl, cyclopentadecyl, cyclohexyldecyl, cycloheptyldecyl, cyclooctadecyl.

Representative Alk groups in the alkylamino propyl moiety include: n-hexyl, n-heptyl, n-octyl, n-nonyl, n-decyl, n-undecyl, n-dodecyl, n-heptyldecyl, n-octodecyl, n-nonyldecyl, and n-eicosanyl, as well as secondary, tertiary, and cycloalkyl groups as described in the preceding paragraph.

The alditonitriles described above can form acid salts which also exhibit varied biocidal activity. Preparation of these more storage-stable biocidal salts is readily achieved by reacting the above-described nitriles with a dilute strong inorganic acid or organic acid. Typical acids include hydrochloric, nitric, sulfuric, hydrobromic, chloroacetic, oxalic, maleic, succinic, p-toluene sulfonic acid, and the like. Separation of the acid salts from the reaction medium is accomplished by any of the more convenient means known to those skilled in the arts.

Representative aldoses which can be used as the starting material for the compounds of this invention include: D & L-Erythrose, D & L-Threose, D & L-Ribose, D & L-Arabinose, D & L-Xylose, D & L-Lyxose, D & L-Allose, D & L-Altrose, D & L-Glucose, D & L-Mannose, D & L-Gulose, D & L-Idose, D & L-Galactose, and D & L-Talose.

A suitable reaction may be schematically described thusly, which yields the claimed compounds:

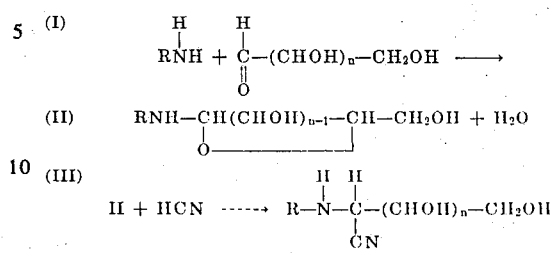

The above schematic is similarly applicable to the embodiment of this invention wherein the R is a normal or cycloalkylamine combining with glucose, followed by treatment of the resulting glycosylamine with HCN. For example, starting with cyclododecylamine, as described, results in the synthesis of 2-N-cyclododecylamino-2-deoxyalditonitrile.

Finally, preparation of compounds wherein R is Alk—$NH(CH_2)_3$—, are prepared in similar fashion. Among the appropriate alkylating agents for the glucose are the commercially available N-alkyl trimethylene diamines derived from coconut, soya, and tallow fatty acids. These are known by the trade name Duomeen and vary in alkyl chain length from 10 to 20 carbon atoms. They have been found to react nicely within the precepts of the present invention.

Typical compounds within the scope of Formula I include the following:

2-N-n-Hexylamino-2-Deoxy-glucoheptononitrile
2-N-Cyclohexylamino-2-Deoxy-glucoheptononitrile
2-N-[3'-Tetradecylaminopropyl]-amino-2-Deoxy-glucoheptononitrile
2-N-n-Heptylamino-2-Deoxy-mannoheptononitrile
2-N-Cycloheptylamino-2-Deoxy-mannoheptononitrile
2-N[3'-Pentadecylaminopropyl]-amino-2-Deoxy-mannoheptononitrile
2-N-n-Octylamino-2-Deoxy-galactoheptononitrile
2-N-Cyclooctylamino-2-Deoxy-galactoheptononitrile
2-N-[3'-Hexadecylaminopropyl]-amino-2-Deoxy-galactophetononitrile
2-N-n-Nonylamino-2-Deoxy-talosoheptononitrile
2-N-Cyclononylamino-2-Deoxy-talosoheptononitrile
2-N-[3'-Heptadecylaminopropyl]-amino-2-Deoxy-talosoheptononitrile
2-N-n-Decylamino-2-Deoxy-allosoheptononitrile
2-N-Cyclodecylamino-2-Deoxy-allosoheptononitrile
2-N-[3'-Octadecylaminopropyl]-amino-2-Deoxy-allosoheptononitrile
2-N-n-Undecylamino-2-Deoxy-altrosoheptononitrile
2-N-Cycloundecylamino-2-Deoxy-altrosoheptononitrile
2-N-[3-Nonyldecylaminopropyl]-amino-2-Deoxy-altrosoheptononitrile
2-N-n-Dodecylamino-2-Deoxy-gulosoheptononitrile
2-N-Cyclododecylamino-2-Deoxy-gulosoheptononitrile
2-N-[3'-Eicosylaminopropyl]-amino-2-Deoxy-gulosoheptononitrile
2-N-n-Tridecylamino-2-Deoxy-idosoheptononitrile
2-N-Cyclotridecylamino-2-Deoxy-idosoheptononitrile
2-N-n-Tetradecylamino-2-Deoxy-ribosohexononitrile 2-N-Cyclotetradecylamino-2-Deoxy-ribosohexononitrile
2-N-n-Pentadecylamino-2-Deoxy-arabinosohexononitrile
2-N-Cyclopentadecylamino-2-Deoxy-arabinosohexononitrile
2-N-n-Hexadecylamino-2-Deoxy-xylosohexononitrile
2-N-Cyclohexadecylamino-2-Deoxy-xylosohexononitrile
2-N-n-Decylamino-2-Deoxy-lyxosohexononitrile
2-N-Cycloheptadecylamino-2-Deoxy-lyxosohexononitrile
2-N-n-Dodecylamino-2-Deoxy-erythrosopentononitrile
2-N-Cyclooctadecylamino-2-Deoxy-erythrosopentononitrile
2-N-n-Tetradecylamino-2-Deoxy-threosopentononitrile
2-N-n-Dodecylacetylamino-2-Deoxy-glucoheptononitrile, pentaacetate
2-N-n-Decylacetylamino-2-Deoxy-glucoheptononitrile, pentapropionate
2-N-n-Tetradecylacetylamino-2-glucoheptononitrile, pentabutyrate
2-N-n-Octylacetylamino-2-glucoheptononitrile, pentavalerate All of the deoxyalditonitriles described can be prepared with a higher alkylamine to yield the corresponding N-alkylaldosamine. Typically in the initial step, glucose is treated with n-decylamine to yield N-(n-decyl) glucosylamine.

The glucosylamine is next treated with hydrocyanic acid to form the corresponding amino-nitrile. In this exemplification, the corresponding 2-N-n-decylamino-2-deoxy glucoheptononitrile results. Upon cooling of the reaction mixture, the aminonitrile crystallizes out in good yields. The crystals may preferably be recovered from the mixture by slurrying in a dilute mineral acid. Generally, the acid salts are quite stable and can be air dried, whereas the bases tend toward instability upon standing for long periods even at room temperatures.

Certain N-substituted-2-Deoxyalditonitriles are reported in the literature. For example, in *Annalen der Chemie* 602 217 (1957) there is disclosed the N-methyl and N-isopropyl sugar amino mixtures; but not the longer aliphatic chain N-alkyl compounds of the present invention. Also, certain N-aryl substituted aldosaminonitriles, such as the N-phenyl-N-tolyl-, and N-benzyl glucosaminic acid nitriles are disclosed in U.S. Pat. No. 2,922,783. None of the prior art, of which I am presently aware, teaches or suggests the here-disclosed biocidal or surface-active properties of the claimed compounds.

By way of illustration, the following examples which are offered to illustrate this invention, are not to be construed as limitations thereof. In Table I, the compounds prepared by the aforedescribed processes and constituting working Examples 1 through 3 are named. It also limits the elemental analysis and melting points. Specific illustrative preparation for the compounds of Examples 1 and 2 are set forth below.

SYNTHESIS:

EXAMPLE 1

Preparation of 2-N-n-dodecylamino-2-deoxy-glucoheptononitrile

To a 1 liter reaction vessel, fitted with stirrer is added 30 ml. of water and 110 gm. of glucose. The mixture is warmed to 45°C. until all the glucose is dissolved and 300 ml. of ethanol is added. After a brief period of mixing, 100 gm. of n-dodecylamine is added, and the mixture stirred at 45°C. for one-half hour. The solution is allowed to cool to room temperature, whereupon the N-n-dodecylglucosylamine crystallizes and is filtered off. The crude glucosylamine is air dried overnight.

To a 1 liter 3-neck reaction flask fitted with stirrer, thermometer, and pressure-equalizing addition funnel is added 700 ml. of anhydrous alcohol and 100 gm. of the above glucosylamine. The slurry is warmed to about 40°–45°C. and 100 ml. of liquid hydrocyanic acid (HCN) added rapidly. The mixture is allowed to stir at 40°C for one-half hour, cooled slowly to room temperature, then put in an ice bath for several hours. The resultant crystals are filtered and dried in a vacuum over at 25°C. The nitrile is obtained in 92 percent yield with better than 95 percent purity.

EXAMPLE 2

Preparation of 2-N-n-Undecylamino-2-deoxy glucoheptononitrile

Glucose (20 g.), n-undecylamine (25 g.) and anhydrous ethanol (75 ml) are charged to a reaction vessel filled with stirrer, thermometer, and dropping funnel. This slurry is stirred and flushed with nitrogen as temperature is raised to 70°C. and held there for 1 hour. The reaction mixture, now clear is cooled to 35°C. and liquid hydrocyanic acid added (30 ml.) along with an additional 100 ml. of anhydrous ethanol. The solution is stirred for an additional 3 hours at 40°–43°C. then stripped to dryness in vacuo.

The resultant light brown powder is better than 90 percent pure nitrile. (%N theory = 7.7; %N found = 7.3)

EXAMPLE 3

When the following long chain amines are substituted for the n-dodecylamine in the procedure of Example 1, the corresponding listed products are obtained:

| STARTING MATERIAL | PRODUCTS |
| --- | --- |
| n-Tetradecylamine | 2-N-n-Tetradecylamino-2-deoxy-glucoheptononitrile HCl |
| n-Hexadecylamine | 2-N-n-Hexadecylamino-2-deoxy-glucoheptononitrile HCl |
| n-Hexylamine | 2-N-n-Hexylamino-2-deoxy-glucoheptononitrile HCl |
| n-Octylamine | 2-N-n-Octylamino-2-deoxy-glucoheptononitrile HCl |
| n-Decylamine | 2-N-n-Decylamino-2-deoxy-glucoheptononitrile HCl |
| n-Tridecylamine | 2-N-n-Tridecylamino-2-deoxy-glucoheptononitrile |
| Cyclodecylamine | 2-N-cyclododecylamino-2-deoxyheptononitrile |
| Duomeen L-11 | 2-(3'-sec-undecylaminopropyl) amino-2-deoxy-glucoheptanonitrile |
| Duomeen C | 2-(3'-cocoamminopropyl) amino-2-deoxyglucoheptanonitrile |
| Duomeen L-15 | 2-(3'-sec-pentadecylaminopropyl) amino-2-deoxyglucoheptanonitrile |
| Duomeen T | 2-(3'-tallowaminopropyl) amino-2-deoxyglucoheptanonitrile |
| 3'-sec-Octadecylaminopropylamine | 2-(3'-sec-octadecylaminopropyl) amino-2-deoxy-glucoheptanonitrile |

TABLE I.—ALDITONITRILE EXAMPLES OF FORMULA I

| Ex. No. | Chemical name | M.P., °C., dec. | N Theory | N Found | C Theory | C Found | O Theory | O Found | Cl Theory | Cl Found |
|---|---|---|---|---|---|---|---|---|---|---|
| 1 | 2-N-n-dodecylamino-2-deoxyglucoheptononitrile HCl | 137 | 6.8 | 6.7 | 55.8 | 55.8 | 19.6 | 18.6 | 8.7 | 8.7 |
| 2 | 2-N-n-tetradecylamino-2-deoxyglucoheptononitrile HCl | 133 | 6.5 | 6.2 | 57.6 | 57.4 | | | 8.0 | .80 |
| 3 | 2-N-n-hexadecylamino-2-deoxyglucoheptononitrile HCl | 117 | 6.0 | 5.4 | 59.2 | 56.0 | | | 7.5 | 9.3 |
| 4 | 2-N-n-hexylamino-2-deoxyglucoheptononitrile HCl | 127 | 8.6 | 7.9 | 47.8 | 45.9 | | | 10.7 | 10.8 |
| 5 | 2-N-n-octylamino-2-deoxyglucoheptononitrile HCl | 138 | 7.9 | 7.2 | 50.9 | 49.1 | | | 9.9 | 10.3 |
| 6 | 2-N-n-decylamino-2-deoxyglucoheptononitrile HCl | 141 | 7.3 | 7.3 | 53.9 | 53.9 | | | 9.3 | 9.3 |
| 7 | 2-N-n-undecylamino-2-deoxyglucoheptononitrile | 111 | 7.7 | 7.3 | 60.0 | 60.4 | 20.9 | 20.6 | | |
| 8 | 2-N-n-tridecylamino-2-deoxyglucoheptononitrile | 113 | 7.2 | 6.7 | 61.9 | 62.7 | 22.2 | 24.5 | | |
| 9 | 2-cyclodecylamino-2-deoxyheptononitrile | 99 | 7.5 | 6.6 | 61.3 | 60.7 | 20.6 | 20.4 | | |
| 10 | 2-(3'-sec-undecylaminopropyl) amino-2-deoxyglucoheptononitrile | 121 | | | | | 21.5 | 22.6 | | |
| 11 | 2-(3'-cocoaaminopropylamino-2-deoxyglucoheptononitrile | 135 | (¹) | 13.9 | (¹) | 59.9 | (¹) | 17.0 | | |
| 12 | 2-(3'-sec-pentadecylaminopropyl) amino-2-deoxyglucoheptononitrile | 95 | 8.9 | 9.8 | 63.8 | 60.1 | 17.0 | 16.0 | | |
| 13 | 2-(3'-tallowaminopropyl) amino-2-deoxyglucoheptononitrile | 122 | (¹) | 10.3 | (¹) | 60.0 | (¹) | 19.3 | | |
| 14 | 2-(3'-ocadecylaminopropyl) amino-2-deoxyglucoheptononitrile | 125 | 8.1 | 9.8 | 65.2 | 58.1 | 15.5 | 21.9 | | |

¹ Molecular weight and exact structure somewhat variable; T=tallowamine; C=cocoaamine.

The novel alditonitriles, and salts of this invention are biocidally active compounds, and as such, are suitable for the control of living organisms, and particularly micro-organisms. For this reason, they are especially effective bactericidal, algaecidal, fungicidal and slimicidal agents.

Algaecidal, fungicidal, and bactericidal activities were evaluated initially by the preliminary agar streak test, in which candidate biocidal compounds are incorporated into conventional agar at concentrations appropriate to the type of organism to be growth inhibited;

a. algaecidal at 20 ppm; fungicidal at 500 ppm, and bactericidal at 500 ppm.

The three test algae are: *Chlorella pyrenaidosa* (Chlorella) Scenedesmus, and "Black" Algae (Oscilatoria sp.)

The three test fungi are: *Aspergillus niger* (A. niger), Rhizopus Stolonifer (Rhizo), and Rhodotorula sp. (Rhodo).

The three test bacteria are: Pseudomonas aeroginosa (P. aeroginosa), Staphylococcus aureus (S. aureus), and Escherichia coli (E. coli).

The test organisms are streaked onto the impregnated agar surface. After incubating for 48 hours, the plates are rated as follows:

| Rating | Equivalent to: | Inhibition |
|---|---|---|
| 0—No Growth | | Complete |
| 1+—Slight growth | | Substantial |
| 2+—Moderate growth | | Moderate |
| 3+—Substantial growth | | Slight |
| 4+—Complete growth | | None |

Table II presents the quantified results as to each of the nine microorganisms for each candidate compound tested.

TABLE II PRELIMINARY AGAR STREAK TEST

| | Biocidal activity | | | | | | | | |
|---|---|---|---|---|---|---|---|---|---|
| | Algae (20 p.p.m.) | | | Fungi (500 p.p.m.) | | | Bacteria (500 p.p.m.) | | |
| Example number | Chlorella | Scenedesmus | Black algae | A. niger | Rhizo | Rhodo | Pseudomonas | S. aureus | E. coli |
| 1 | 0 | 0 | 0 | 1+ | 1+ | 1+ | 2+ | 0 | 0 |
| 2 | 0 | 0 | 0 | 1+ | 0 | 0 | 1+ | 0 | 3+ |
| 3 | 2+ | 1+ | 4+ | 4+ | 4+ | 3+ | 4+ | 0 | 4+ |
| 4 | 4+ | 4+ | 4+ | 4+ | 1+ | 1+ | 4+ | 4+ | 3+ |
| 5 | 1+ | 1+ | 4+ | 1+ | 0 | 0 | 3+ | 4+ | 1+ |
| 6 | 0 | 0 | 0 | 1+ | 0 | 0 | 0 | 0 | 0 |
| 7 | 0 | 0 | 0 | 1+ | 1+ | 0 | 2+ | 0 | 0 |
| 8 | 0 | 0 | 0 | 1+ | 1+ | 0 | 3+ | 0 | 1+ |
| 9 | 2+ | 1+ | 4+ | 1+ | 1+ | 0 | 4+ | 0 | 0 |
| 10 | 4+ | 2+ | 4+ | 1+ | 1+ | 0 | 4+ | 0 | 1+ |
| 11 | 4+ | 4+ | 4+ | 3+ | 2+ | 3+ | 4+ | 0 | 4+ |
| 12 | 3+ | 1+ | 4+ | 3+ | 0 | 0 | 4+ | 0 | 4+ |
| 13 | 4+ | 3+ | 4+ | 4+ | 3+ | 4+ | 4+ | 1+ | 4+ |
| 14 | 4+ | 4+ | 4+ | 4+ | 2+ | 4+ | 4+ | 0 | 3+ |

The compounds of this invention were then secondarily evaluated by the Serial Dilution Test (Broth Titer Test), wherein a series of broths containing varying dilutions of a test compound and an organism are halved, starting with 1:1000 ratio (1000 ppm); 1:2000; 1:4000; 1:8000; and set forth to as low as needed to titrate to the endpoint.

The values obtained, which are presented in Table III represent the maximum dilution at which the candidate biocide renders complete biostatic control of the organism. As in the agar streak test, Chlorella, and "Black" Algae were the test algae. *A. niger*, Rhizo, were the test fungi; and *P. aeroginosa*, *S. aureus*, and *E. coli* were the test bacteria.

Data are recorded as: Growth = +, or No growth = −. G-11 (Hexachlorophene) is used as standard biocide, giving the following values:

| Organism | Lowest Dilution Giving No Growth |
|---|---|
| P. solaracerum | 1:256,000 (39 ppm) |
| P. aeruginosa | 1:32,000 (31.75 ppm) |

TABLE III.—MICROBIOSTATIC ENDPOINT, PARTS PER MILLION

| Ex. No. | Serial dilution assay | | | | | | |
|---|---|---|---|---|---|---|---|
| | Chlorella | Black algae | A. niger | Rhizo | S. aureus | Pseudomonas | E. coli |
| 1 | 0.63 | 1.25 | 16 | 16 | 16 | 500 | 31 |
| 2 | 0.63 | >20 | 63 | 32 | 4 | 500 | 250 |
| 3 | Not tested | | | | | | |
| 4 | Not tested | | | | | | |
| 5 | 20± | >20 | 500 | 250 | | | |
| 6 | 1.25± | 5 | 63 | 16 | 125 | 250 | 250 |
| 7 | 0.3–0.6 | 5 | 63 | 16 | 31 | 500 | 125 |
| 8 | 0.3 | 1.25 | 16 | 8 | 4 | 500 | 63 |
| 9 | 10 | 20 | 250 | 250 | 63 | 500 | 500 |
| 10 | 20 | >20 | 250 | 125 | 63 | 500 | 250 |
| 11 | N.T. | N.T. | N.T. | N.T. | M.T. | N.T. | N.T. |
| 12 | N.T. | N.T. | 250 | 250 | N.T. | N.T. | N.T. |
| 13 | 10 | >20 | 500 | 250 | >500± | >500 | >500 |
| 14 | 10 | >20 | 500± | 250 | >500± | >500 | >500 |

The compounds of this invention have also been confirmed as having sufficiently low surface tension which may prove to make them self-emulsifiers. Data on exemplary species of the claimed compounds are presented in Table IV below. Also, comparative values for known commercial surfactants are presented along therewith.

TABLE IV

Surface Activity Data Obtained for Disclosed Compounds and Commercial Surfactants

| Ex. No. | Compound Name | Surface Tension 0.1% (corrected) | (dynes/cm) |
|---|---|---|---|
| 1 | 2-N-n-dodecyl-2-deoxy-glucoheptononitrile hydrochloride | 28.1 | (ph~4.7) |
| 2 | 2-N-n-tetradecyl-2-deoxy-glucoheptononitrile hydrochloride | 24.0 | (ph~3.9) |
| 6 | 2-N-n-decylamino-2-deoxy-glucoheptononitrile hydrochloride | 23.6 | (ph~4) |
| | TRITON X-100 (OPE$_{10}$) | 30.0 | |
| | Nacconal NRSF (Alkylbenzene sulphonate) | 31.5 | |
| | SIPON WD (Sodium laurylsufate) | 33.5 | |
| | WR 3965 (Dodecyltrimethyl ammonium chloride) | 40.0 | |

I claim:

1. 2-N-Alkylamino-2-Deoxy-alditonitriles of the general structural formula:

$$\begin{array}{c} R \quad\quad R' \\ \diagdown \;\; \diagup \\ N \\ | \\ NC-C-(CHOR')_n-CH_2OR' \\ | \\ H \end{array}$$

wherein R is one of alkyl straight or branched having from eight to 16 carbon atoms; cycloalkyl having 10 to 14 carbons, and Alkyl-NH(CH$_2$)$_3$—, wherein Alkyl is 10 to 20 carbons; each R' is concurrently acetyl or is H; and n is a whole positive integer from 2 to 4.

2. A compound of claim 1 wherein n is four, R is cyclodecyl, and the R' groups are hydrogen.

3. A compound of claim 1 wherein n is four and R is dodecyl, and the R' groups are hydrogen.

4. A compound of claim 1 wherein n is four and R is dodecyl and the R' groups are acetyl.

5. A compound of claim 1 wherein n is four, R is 3-octadecylaminopropyl, and the R' groups are hydrogen.

* * * * *